US006634161B2

(12) United States Patent
Williams

(10) Patent No.: US 6,634,161 B2
(45) Date of Patent: Oct. 21, 2003

(54) BLADE CHANGING SYSTEM FOR ROTARY CUTTING MACHINE

(76) Inventor: Charles G. Williams, 1432 Forbes St., Fredericksburg, VA (US) 22405

( * ) Notice: Subject to any disclaimer, the term of this patent is extended or adjusted under 35 U.S.C. 154(b) by 0 days.

(21) Appl. No.: 09/878,938

(22) Filed: Jun. 13, 2001

(65) Prior Publication Data
US 2002/0026777 A1 Mar. 7, 2002

Related U.S. Application Data

(60) Provisional application No. 60/230,415, filed on Sep. 6, 2000.

(51) Int. Cl.[7] ............................................. A01D 34/03
(52) U.S. Cl. ............................ 56/17.5; 56/1; 29/525.01
(58) Field of Search ............................ 29/525.01, 240, 29/270, 281.1; 56/12.7, 295, 255, 1, 20, 17.5; 30/276; 76/82.1

(56) References Cited

U.S. PATENT DOCUMENTS

| 2,993,518 | A | | 7/1961 | Bork |
| 3,101,629 | A | | 8/1963 | Koelndorfer |
| 3,173,234 | A | | 3/1965 | Vodinelich |
| 3,395,521 | A | * | 8/1968 | Crockett et al. |
| 4,208,859 | A | | 6/1980 | Brockway |
| 4,478,028 | A | | 10/1984 | Dawson, Jr. |
| 4,564,991 | A | | 1/1986 | Taylor |
| 4,736,544 | A | | 4/1988 | Greenquist |
| 4,860,525 | A | | 8/1989 | Chee |
| 4,882,960 | A | | 11/1989 | Kugler |
| D309,855 | S | | 8/1990 | Davidson |
| 4,956,905 | A | | 9/1990 | Davidson |
| 5,791,131 | A | | 8/1998 | Hill et al. |
| 5,865,018 | A | | 2/1999 | Wanie |

* cited by examiner

Primary Examiner—John C. Hong
(74) Attorney, Agent, or Firm—Diederiks & Whitelaw, PLC

(57) ABSTRACT

A blade for a rotary cutting machine includes at least one polygonal shaped opening longitudinally spaced from a central portion of the blade. The polygonal shaped opening is adapted to receive a drive head of a conventional socket wrench, a standard Allen wrench, a Torx head type wrench or other similar tool. The polygonal shaped opening enables a user to generate sufficient torque to prevent the blade from being undesirably rotated while the blade is drivingly connected or disconnected from a driveshaft of the rotary cutting machine. In this fashion, the blade may be changed efficiently and effectively using standard tools.

22 Claims, 2 Drawing Sheets

BLADE CHANGING SYSTEM FOR ROTARY CUTTING MACHINE

This application claims the benefit of U.S. Provisional Application No. 60/230,415, filed Sep. 6, 2000.

BACKGROUND OF THE INVENTION

1. Field of the Invention

The present invention pertains to the art of rotary cutting machines and, more particularly, to a blade changing system for such a machine.

2. Discussion of the Prior Art

There exists various types of rotary cutting machines incorporating blades which need to be disconnected from a drive source in order to be periodically replaced or sharpened. For example, lawn mower blades should be sharpened or replaced at least yearly for peak effectiveness. In general, removing a lawn mower blade requires somehow retaining the blade from rotating while removing a retaining bolt used to drivingly interconnect the blade to an engine shaft. Removing a blade retaining bolt can often be difficult, and even dangerous. In fact, it is not uncommon for a retaining bolt to be over tightened or even rusted in place.

Regardless of the condition of the retaining bolt, it is necessary to prevent the blade from rotating while the high torque necessary to loosen the bolt can be applied, generally through the use of a wrench. Oftentimes, when changing a blade on a lawn mower, a block of wood, a brick or other handy object is initially placed between the blade and a discharge chute or other deck portion of the mower to prevent the blade from shifting as the bolt is being rotated. If the object slips, a cut or bruised hand may result. As an alternative, one can resort to utilizing leather work gloves for holding a blade secure while the bolt is loosened. This type of arrangement is not always effective as merely grasping the end of the blade with a gloved hand may not enable sufficient leverage to be developed to enable an overly tightened or rusted bolt to be removed. In addition, depending upon the condition of the blade and the quality of the gloves, this operation may be hazardous.

The problems associated with removing or installing a blade on a lawn mower can be further compounded by the ground level location of the blade. That is, the blade may only be limitedly visible and accessibe through the discharge chute unless the mower is run up on blocks, elevated on jacks, tilted backwardly or turned upside down. Although a push-type lawn mower can be fairly easily placed on its side to enhance access to the blade, the same is not possible in connection with a riding lawn mower. Oftentimes, even a heavy riding lawn mower is not elevated on blocks just to remove or install a blade. Instead the mower deck is simply elevated as far as possible which generally provides about 5 inches (approximately 12.5 cm) of visibility and working space for a person lying or crouching on the ground.

Regardless of the degree of accessibility of the blade, changing a blade can represent a dangerous endeavor, particularly due to the problem of adequately preventing the blade from undesirability rotating. One attempt to solve this problem of how to effectively hold a mower blade is described in U.S. Pat. No. 4,364,991 issued to Taylor. This patented arrangement involves the use of a specialty tool designed to be used in connection with a mower which is turned upside down. U.S. Pat. No. 4,956,905 issued to Davidson also addresses this problem in a similar manner by providing a dedicated tool for preventing undesirable rotation of the blade. In general, it is considered that providing a specialty tool is not cost effective or commercially viable, particularly due to the relatively infrequent need to work on the blades. However, providing a safe and effective system for changing a blade, i.e., either replacing a blade or removing it for sharpening and then reinstalling the same, is still considered an important issue to address in connection with lawn mowers, as well as other rotary cutting machines.

Based on the above, there exists a need in the art for a blade changing system which can be effectively used to either remove or mount a blade to a rotary cutting machine under a wide range of conditions, while not requiring a specialty tool.

SUMMARY OF THE INVENTION

The present invention is directed to a convenient and effective blade changing system wherein the blade is modified to directly cooperate with conventional tools which can be readily used to both retain the blade from rotating and to either tighten or loosen a fastening member for the blade. More specifically, the blade, which includes a generally centrally located opening through which a retaining bolt is adapted to extend, is formed with one or more polygonal shaped holes at a position longitudinally spaced from the central opening. The polygonal shaped hole is adapted to receive a hand tool commonly found in a standard tool set. In accordance with the first embodiment of the invention, the polygonal hole is square-shaped and sized to receive the head of either a conventional ⅜" or ½" ratchet. In this arrangement, the drive of the ratchet is received in the polygonal hole and the handle end of the ratchet can be held by the user to prevent rotation of the blade while the threaded fastening member is rotated through the use of another wrench or the like. In accordance with a second embodiment, the polygonal hole is hexagonal in shape and is adapted to receive a standard Allen wrench. In a still further embodiment, the polygonal hole is configured to receive a Torx head-type wrench.

The present invention is particularly applicable for use in connection with installing or removing the blade of a lawn mower. When applied to this environment, the head of the ratchet can be readily inserted within the polygonal hole and a socket wrench or the like can be utilized to rotate a conventional retaining bolt used to drivingly interconnect the blade with an engine driveshaft of the mower. Regardless of the particular embodiment employed, no specialty tool is needed in connection with changing the blade, but rather only a couple of tools found in a standard tool box or kit are needed. In addition to avoiding the need for a specialty tool, the blade changing system of the present invention advantageously represents an arrangement which enables a user to readily provide a sufficient amount of counteractive force to prevent undesired rotation of the blade during removal or tightening of the retaining member.

Additional objects, features and advantages of the present invention will become more readily apparent from the following detailed description of preferred embodiments thereof when taken in conjunction with the drawings wherein like reference numerals refer to corresponding parts in the several views.

DETAILED DESCRIPTION OF THE PREFERRED EMBODIMENTS

Figure 1:
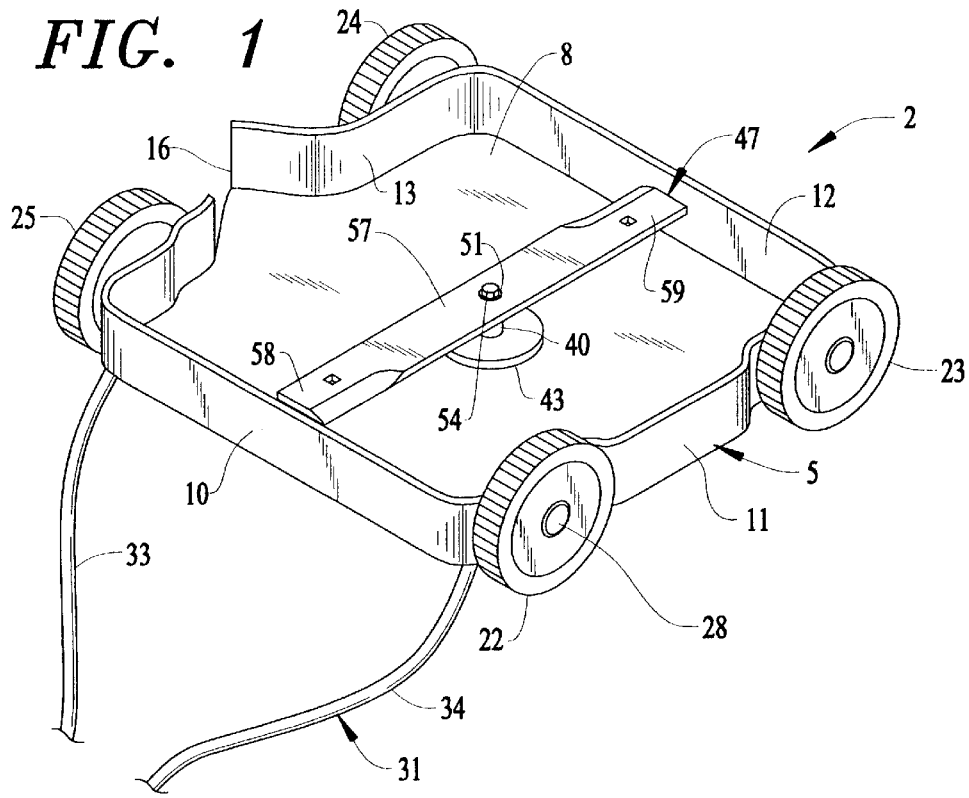
FIG. 1 is a partial perspective view of an inverted lawn mower incorporating the blade changing system of the present invention.

With initial reference to FIG. 1, a lawn mower 2 is depicted having a deck 5. In a manner generally known in the art, deck 5 is defined by an upper panel portion 8 and a plurality of peripheral side panel portions 10–13. Peripheral side panel portion 13 is configured of multiple sections and defines a discharge opening or chute indicated at 16. Deck 5 has attached thereto a plurality of wheels 22–25. More specifically, wheel 22–25 are mounted for rotation to deck 5 by any means known in the art, such as the use of respective bolts, one of which is indicated at 28. Lawn mower 2 also includes a handle partially indicated at 31 including legs 33 and 34. In the embodiment shown, lawn mower 2 depicts a push mower of the type generally known in the art. However, as will become more apparent below, the present invention is equally applicable to other types of lawn mowers, including self-propelled and tractor-type mowers, as well as other types of machines having rotary cutters such as portable brush cutters, edgers and the like.

Lawn mower 2 has associated therewith an engine (not shown) that includes a driveshaft 40 which projects through a generally central section of upper panel portion 8 of deck 5. As shown, driveshaft 40 is supported by a plate 43 for rotation relative to deck 5. Attached to driveshaft 40, for concurrent rotation therewith, is a blade 47. At this point, it should be realized that the general construction of lawn mower 2 as described above is known in the art. In any event, blade 47 includes a substantially central opening 51 through which extends a retaining bolt 54 which is preferably threaded to driveshaft 40 to drivingly interconnect blade 47 with driveshaft 40 for concurrent rotation. The present is particularly directed to the construction of blade 47 and the manner in which this construction enables an operator to readily change blade 47 or simply remove blade 47 for sharpening purposes.

Figure 3:
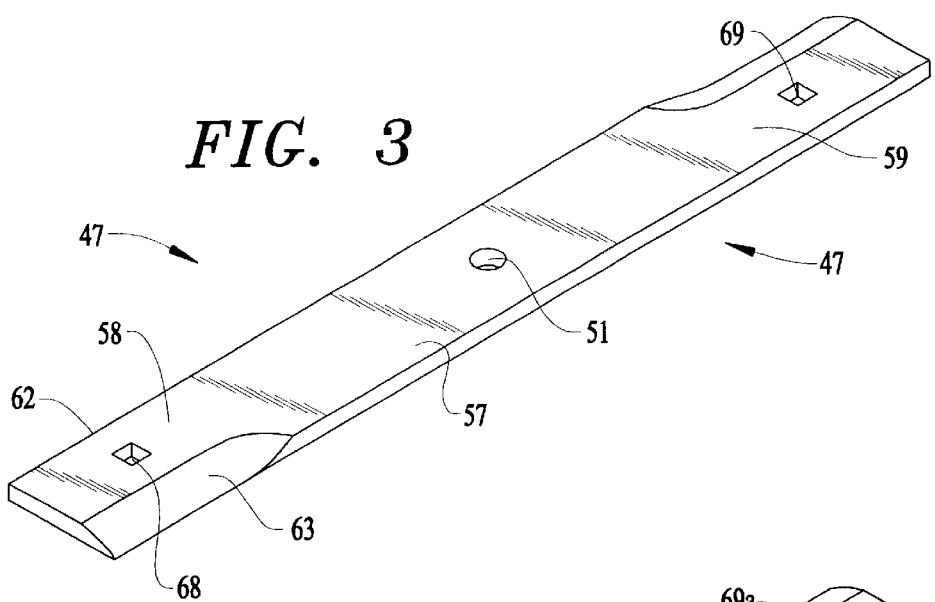
FIG. 3 is an upper perspective view of a lawn mower blade constructed in accordance with a first preferred embodiment of the invention.

With particular reference to FIGS. 1 and 3, a first preferred embodiment of blade 47 will now be described in detail. In general, blade 47 includes a central portion 57, which is provided with opening 51, and terminal end portions 58 and 59. Each terminal end portion 58, 59 is defined by a blunt edge 62 and a sharpened edge 63. Again, this structure is widely known in the art. However, in accordance with the present invention, blade 47 is also formed with a pair of longitudinally spaced polygonal-shaped holes 68 and 69. In the most preferred form of the invention, holes 68 and 69 are provided at terminal end portions 58 and 59 respectively. However, as will become more fully evident below, it is merely important that holes 68 and 69 be longitudinally spaced from central opening 51.

Figure 2:
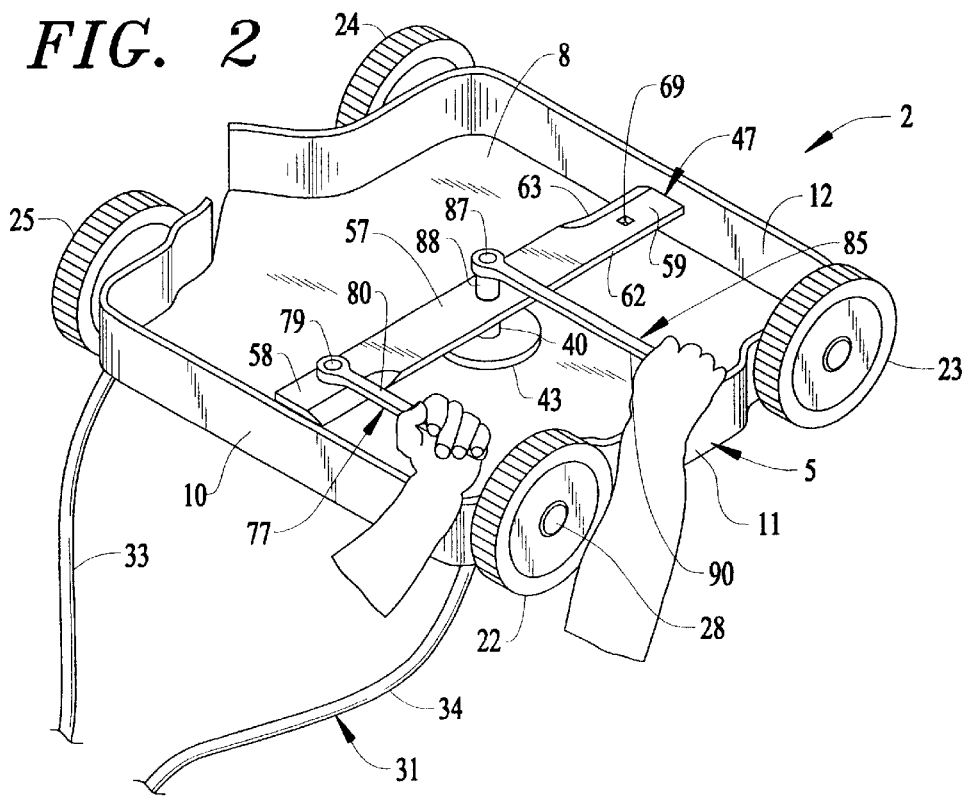
FIG. 2 is a perspective view, similar to that of FIG. 1, illustrating the invention during use.

In this preferred embodiment, holes 68 and 69 extend entirely through blade 47 and are square-shaped. With this preferred construction, an operator of lawn mower 2 can remove blade 47 in a safe and efficient manner. More specifically, with particular reference to FIG. 2, an operator need merely apply a commonly known ratchet wrench 77, having a head 79 and a handle 80, at one of holes 68 and 69, while applying a second ratchet wrench 85 to retaining bolt 54. More specifically, second ratchet wrench 85 includes a head 87 provided with a socket 88 that is mated with retaining bolt 54, and a handle 90 that is grasped by the user. As conventional ratchet wrenches come in various standard sizes, such as ⅜", ½" or ¾", holes 68 and 69 are correspondingly sized. Therefore, with first ratchet wrench 77 attached at hole 68 and second ratchet wrench 85 attached to retaining bolt 54, an operator need merely to push/pull the wrenches 77 and 85 in opposing directions to either tighten or loosen retaining bolt 54 as desired. Of course, many rotary cutting machines mount blades through the use of left handed threads in order to prevent unwanted loosening of the corresponding retaining bolts during operation. However, assuming that retaining bolt 54 is loosened by rotation in the counterclockwise direction as shown in FIG. 2, the operator can push on handle 90 of wrench 85 while pulling on handle 80 of wrench 77 in order to readily loosen retaining bolt 54.

Of course, other tools could be employed in accordance with the invention. For instance, second ratchet wrench 85 with socket 88 need not be utilized. Instead, it is only important in accordance with the present invention that holes 68 and 69 be configured so as to be useful with standard tools, i.e., basic tools commonly owned by a homeowner or the like. Therefore, instead of requiring a specialty tool to change blade 47 in a manner analogous to that of the prior art, the actual construction of blade 47 is altered so as to enable a conventional tool, i.e., a ratchet as in the embodiments of FIGS. 1–3, to be utilized in changing blade 47.

Figure 4:
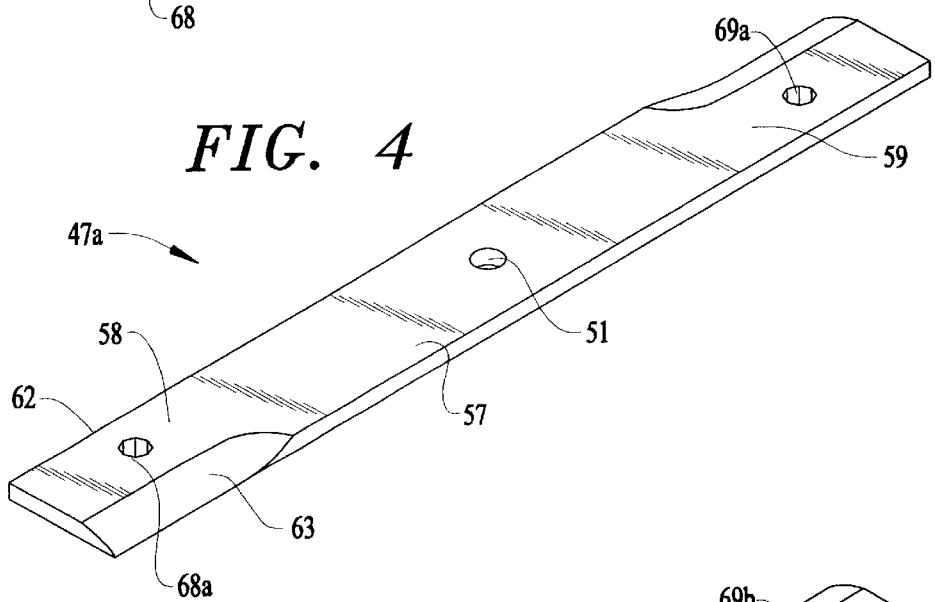
FIG. 4 is an upper perspective view of a lawn mower blade constructed in accordance with a second preferred embodiment of the invention.
Figure 5:
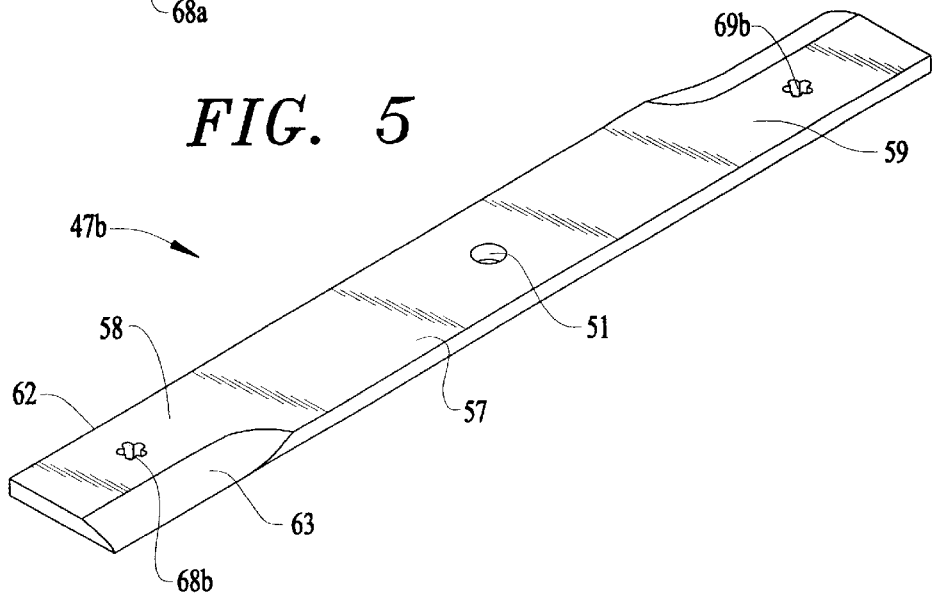
FIG. 5 is an upper perspective view of a lawn mower blade constructed in accordance with a third preferred embodiment of the invention.

FIG. 4 depicts a second preferred embodiment of the invention wherein a blade 47a is provided with polygonal shaped holes 68a and 69a which are hexagonal such that holes 68a and 69a are adapted to receive a conventional Allen wrench (not shown), which would be used to counteract force developed at retaining bolt 54 in a manner directly analogous to ratchet wrench 77 as discussed above. FIG. 5 depicts a still further embodiment wherein a blade 47b is provided with polygonal shaped holes 68b and 69b of the Torx type. Again, it should be understood that it is only important that the blade be provided with at least one hole that is spaced from retaining bolt 54 and accommodates a conventional or standard tool to provide the advantages of the present invention.

Although described with respect to preferred embodiments of the invention, it should be readily understood that various changes and/or modifications can be made to the invention without departing from the spirit thereof. For instance, although particularly described with reference to lawn mower 2, it should be recognized that blades of other known types of rotary cutting machines, including motorized brush cutters, edgers and the like, could be advantageously changed in a corresponding manner. In any event, the invention is only intended to be limited by the scope of the following claims.

I claim:

1. A rotary cutting machine comprising:
   a motor including a driveshaft;
   a blade including first and second, longitudinally spaced end portions and a central portion located longitudinally between the first and second end portions, with each of said first and second end portions having at least one sharp edge, said blade being adapted to be drivingly connected to the driveshaft at the central portion; and at least one polygonal opening formed in the blade longitudinally between said central portion and at least one of said first and second end portions, said at least one polygonal opening being sized to snugly receive a drive head of a ratchet for retaining the blade in a desired orientation through controlling of the ratchet when the blade is selectively, drivingly connected to and disconnected from the driveshaft.

2. The rotary cutting machine according to claim 1, wherein two polygonal openings are formed in the blade between the central portion and the first and second end portions respectively.

3. The rotary cutting machine according to claim 1, wherein the at least one polygonal opening is square in shape.

4. The rotary cutting machine according to claim 3, wherein the at least one polygonal opening is sized to receive at least one of a ⅜, ½ and ¾ inch ratchet drive head.

5. The rotary cutting machine according to claim 1, wherein the at least one polygonal opening is hexagonal in shape.

6. The rotary cutting machine according to claim 1, wherein the rotary cutting machine constitutes a lawn mower.

7. The rotary cutting machine according to claim 6, further comprising:
a deck supported for movement over a surface, wherein said driveshaft extends and said blade is arranged below the deck.

8. The rotary cutting machine according to claim 7, wherein the blade is directly, drivingly connected to the driveshaft.

9. A blade adapted to be drivingly connected to a driveshaft of a rotary cutting machine comprising:
first and second, longitudinally spaced end portions, with each of said first and second end portions having at least one sharp edge;
a central portion located longitudinally between the first and second end portions, said blade being adapted to be drivingly connected to the driveshaft at the central portion; and
at least one polygonal opening formed in the blade longitudinally between said central portion and at least one of said first and second end portions, said at least one polygonal opening being sized to snugly receive a wrench for retaining the blade in a desired orientation through controlling of the wrench when the blade is selectively, drivingly connected to and disconnected from the driveshaft of the rotary cutting machine.

10. The blade according to claim 9, wherein two polygonal openings are formed in the blade between the central portion and the first and second end portions respectively.

11. The blade according to claim 9, wherein the at least one polygonal opening is square in shape.

12. The blade according to claim 11, wherein the at least one polygonal opening is sized to receive at least one of a ⅜, ½ and ¾ inch ratchet drive head.

13. The blade according to claim 9, wherein the at least one polygonal opening is hexagonal in shape.

14. A rotary cutting machine comprising:
a motor including a driveshaft;
a blade including first and second, longitudinally spaced end portions and a central portion located longitudinally between the first and second end portions, with each of said first and second end portions having at least one sharp edge, said blade being adapted to be drivingly connected to the driveshaft at the central portion; and
polygonal opening means, provided on the blade longitudinally between said central portion and at least one of said first and second end portions, for snugly receiving a portion of a wrench used to retain the blade from rotation when the blade is selectively, drivingly connected to and disconnected from the driveshaft.

15. The rotary cutting machine according to claim 14, wherein said polygonal opening means comprises two polygonal openings formed in the blade between the central portion and the first and second end portions respectively.

16. The rotary cutting machine according to claim 14, wherein said polygonal opening means is square in shape.

17. The rotary cutting machine according to claim 16, wherein said polygonal opening means is sized to receive at least one of a ⅜, ½ and ¾ inch ratchet drive head.

18. The rotary cutting machine according to claim 14, wherein said polygonal opening means is hexagonal in shape.

19. The rotary cutting machine according to claim 14, wherein the rotary cutting machine constitutes a lawn mower.

20. The rotary cutting machine according to claim 19, further comprising: a deck supported for movement over a surface, wherein said driveshaft extends and said blade is arranged below the deck.

21. The rotary cutting machine according to claim 20, wherein the blade is directly, drivingly connected to the driveshaft.

22. The rotary cutting machine according to claim 14, wherein the blade constitutes a unitary member.

* * * * *